United States Patent [19]

Matsuda et al.

[11] Patent Number: 4,638,435
[45] Date of Patent: Jan. 20, 1987

[54] ELECTRONIC CASH REGISTER HAVING DIRECT PRICE LOOK-UP FUNCTION

[75] Inventors: Kumehiko Matsuda, Jyoyo; Kensaku Komai, Yamatokoriyama, both of Japan

[73] Assignee: Sharp Kabushiki Kaisha, Osaka, Japan

[21] Appl. No.: 564,205

[22] Filed: Dec. 22, 1983

[30] Foreign Application Priority Data

Dec. 27, 1982 [JP] Japan .................. 57-231087

[51] Int. Cl.⁴ ............................................. G06F 15/20
[52] U.S. Cl. ..................................... 364/405; 364/900
[58] Field of Search ... 364/405, 709, 710, 200 MS File, 364/900 MS File

[56] References Cited

U.S. PATENT DOCUMENTS

| 4,293,911 | 10/1981 | Oonishi | 364/405 |
| 4,317,172 | 2/1982 | Nakano | 364/405 |
| 4,419,738 | 12/1983 | Takahashi et al. | 364/405 |
| 4,430,713 | 2/1984 | Nakatani et al. | 364/405 |
| 4,441,160 | 4/1984 | Azcua et al. | 364/900 |

FOREIGN PATENT DOCUMENTS 0127660 10/1980 Japan .................. 364/405

*Primary Examiner*—Gary V. Harkcom
*Attorney, Agent, or Firm*—Birch, Stewart, Kolasch & Birch

[57] ABSTRACT

An electronic cash register includes a PLU instruction key for conducting the PLU (price look-up) function, and department keys for introducing the department information. A memory system is provided for presetting a desired PLU code to each of the department keys. When a desired department key is actuated in the direct PLU mode registration operation, the preset PLU code is read out to look up the unit cost stored in the memory area corresponding to the read out PLU code.

1 Claim, 6 Drawing Figures

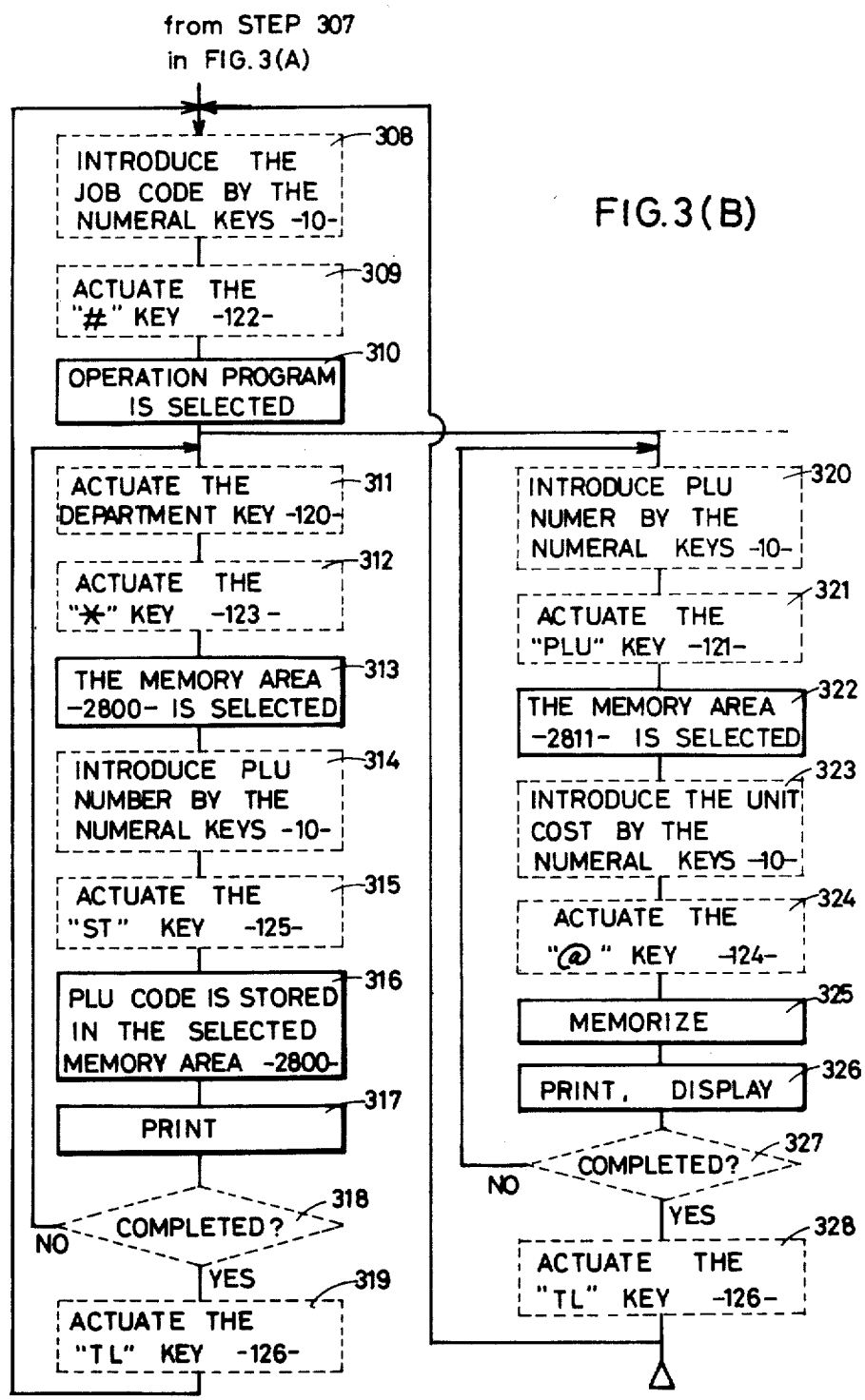

ELECTRONIC CASH REGISTER HAVING DIRECT PRICE LOOK-UP FUNCTION

BACKGROUND AND SUMMARY OF THE INVENTION

The present invention relates to an electronic cash register and, more particularly, to an electronic cash register which has a PLU (price look-up) function.

Generally, in an electronic cash register which has the PLU function, to conduct the registration operation, numeral keys, for example, "1", "0" and "0" and a PLU instruction key "PLU" are operated to register the transaction data related to the PLU number "100". In such a system, the number of key actuations required to input the data is considerably high and, therefore, a high speed registration is difficult. In another conventional system, a plurality of PLU registration keys for exclusive use are provided to input the PLU data. In this system, an large number of keys is required and, thus, the keyboard construction is complicated.

Accordingly, an object of the present invention is to provide a novel registration control system in an electronic cash register.

Another object of the present invention is to provide an electronic cash register which simplifies the key input operation of the PLU data.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a memory system is provided for presetting a desired PLU number for a selected department key. When the selected department key is actuated, the PLU number stored in the memory system is read out to conduct the registration operation in the direct PLU mode. If the electronic cash register has thirty (30) department keys, the registration operation related to thirty (30) PLU numbers can be conducted in the direct PLU mode.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIGS. 3(A) and 3(B) are flow charts for explaining a preset operation conducted by the electronic cash register of FIG. 1.

DESCRIPTION OF THE PREFERRED EMBODIMENTS

Figure 2:
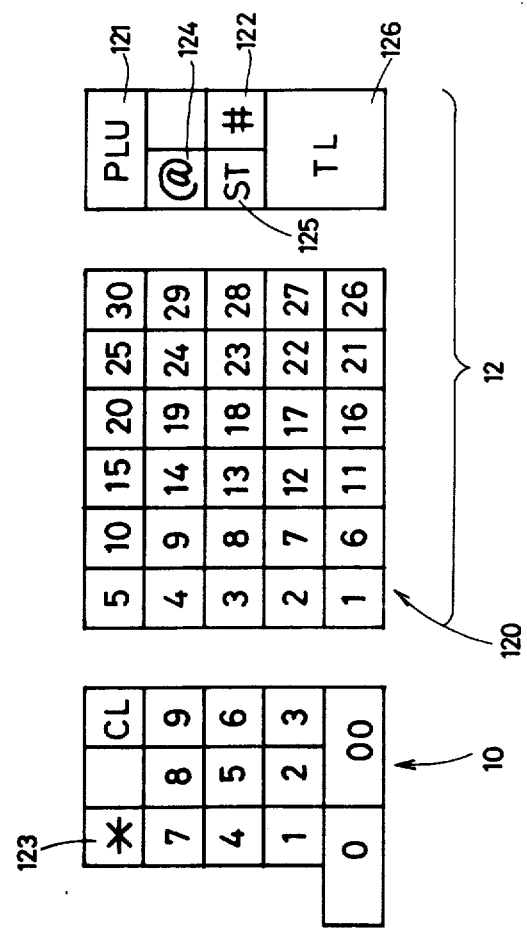
FIG. 2 is a plan view of a keyboard panel included in the electronic cash register of FIG. 1.
Figure 3A:
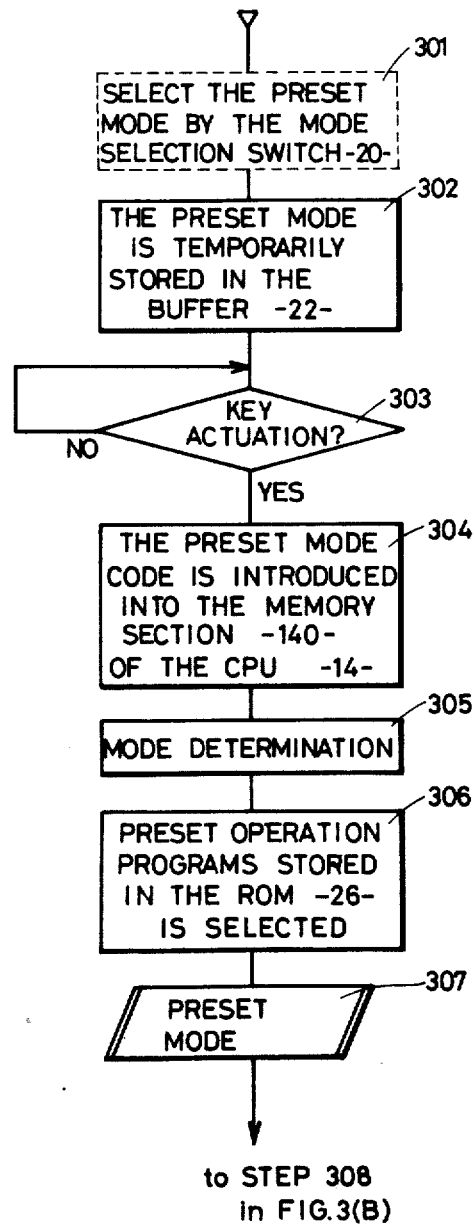
Figure 4:
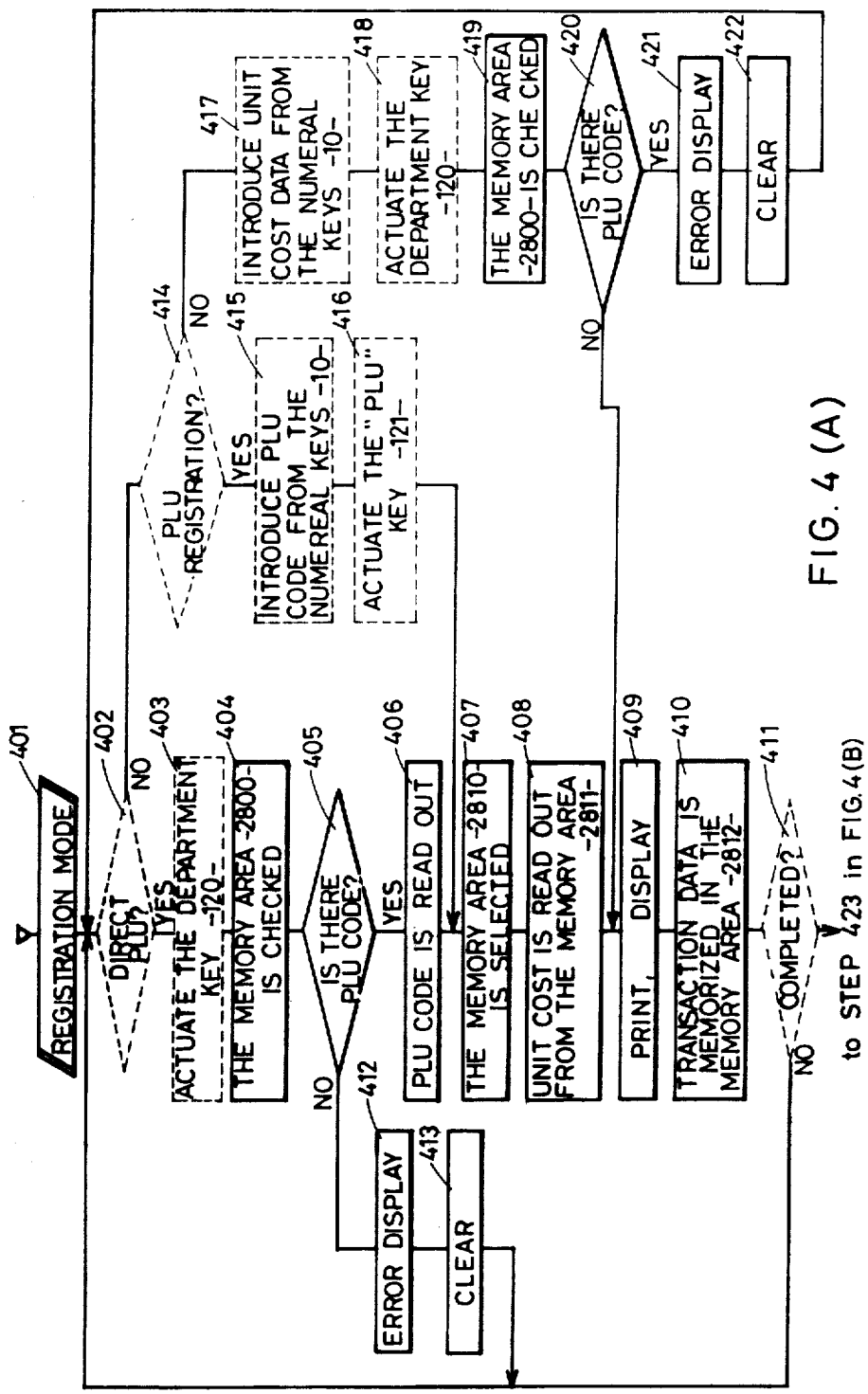
FIGS. 4(A) and 4(B) are flow charts for explaining a registration operation conducted by the electronic cash register of FIG. 1.
Figure 4:
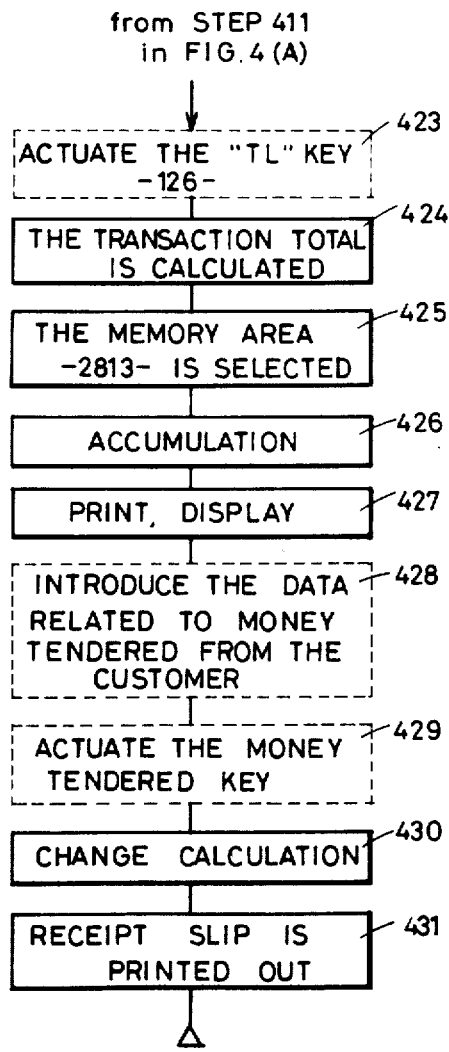

The electronic cash register of the present invention includes numeral keys 10 for introducing numeral data, and function keys 12 for introducing function commands. The numeral data introduced from the numeral keys 10 is transferred to a central processing unit (CPU) 14 via a key encoder 16. FIG. 2 shows a keyboard which includes the numeral keys 10 and the function keys 12. The function keys 12 include department keys 120 for identifying the department to which the article belongs (in this example, department "1" through department "30"), a PLU instruction key (PLU) 121, a program selection instruction key (#) 122, a department memory selection key (*) 123, a unit cost key (@) 124, a PLU code input key (ST) 125 and a registration operation completion instruction key (TL) 126. A key determination circuit 18 is connected to the function keys 12 to detect the actuation of the function keys 12.

A mode selection switch 20 is provided for selecting the preset mode and the registration mode. The mode information selected by the mode selection switch 20 is temporarily stored in a buffer 22. When any one of the numeral keys 10 or the function keys 12 is actuated, a key input detection circuit 24 develops a control signal to transfer the mode information temporarily stored in the buffer 22 to a mode memory section 140 included in the central processing unit (CPU) 14. A read only memory (ROM) 26 is connected to the central processing unit (CPU) 14, which memorizes programs for controlling various operations conducted by the central processing unit (CPU) 14.

A random access memory (RAM) 28 is connected to the central processing unit (CPU) 14 in order to store the data processed by the central processing unit (CPU) 14. The random access memory (RAM) 28 includes a memory section 280 associated with the department keys 120, and another memory section 281 for storing the data related to the PLU function. The memory section 280 includes memory areas 2800 for storing PLU codes associated with the direct PLU operation, and memory areas 2801 for storing transaction data registered in the department registration mode. The memory section 281 includes memory areas 2810 for storing the PLU code number, memory areas 2811 for storing the unit cost data of the corresponding PLU code number, and memory areas 2812 for storing transaction data related to the corresponding PLU code number. The central processing unit (CPU) 14 is further connected to a display device 30 for visually displaying the operation results, and a printer 32 for printing out the operation results onto a receipt slip and/or journal paper.

Figure 1:
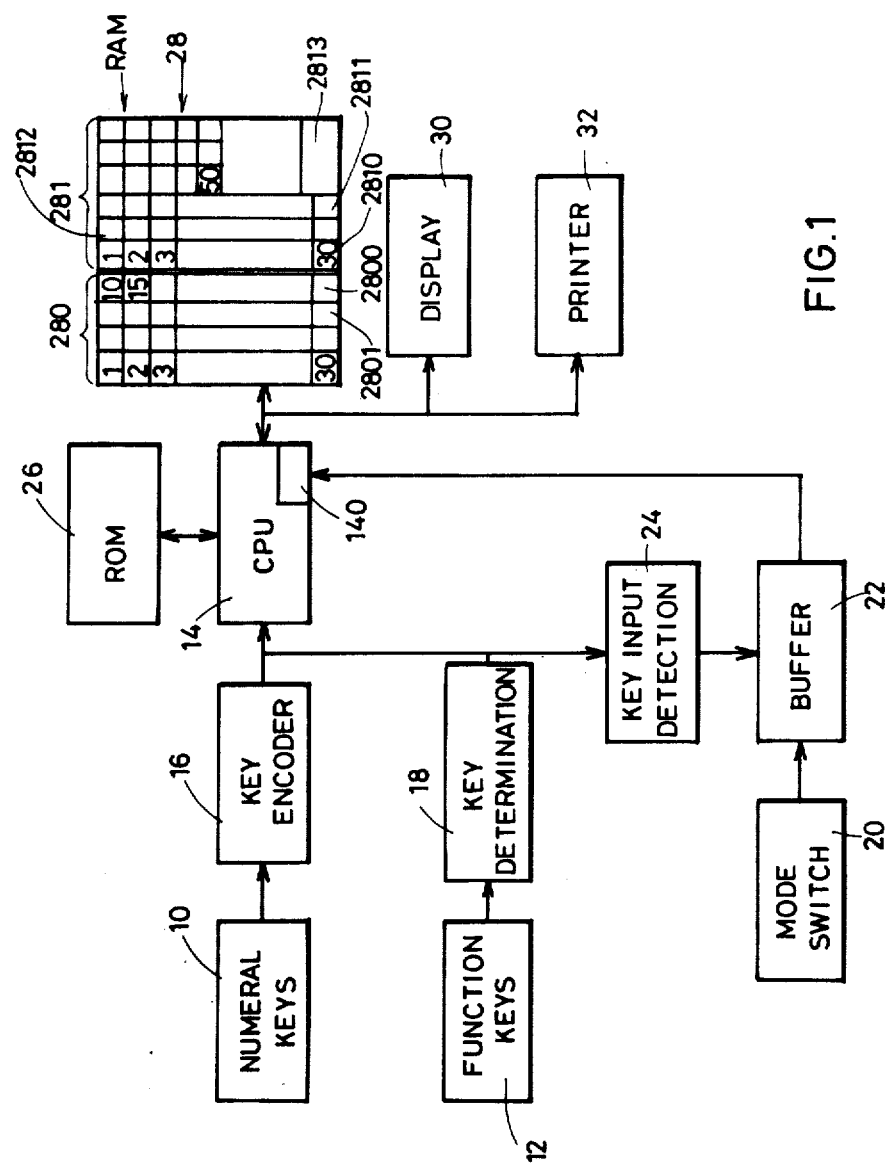
FIG. 1 is a block diagram of an embodiment of an electronic cash register of the present invention.

An operational mode of the electronic cash register of FIG. 1 will be described with reference to FIGS. 3(A), 3(B), 4(A) and 4(B).

[1. PRESET OPERATION]

In order to conduct the preset operation, the electronic cash register is placed in the preset mode. More specifically, the mode selection switch 20 is operated to select the preset mode (step 301). The preset mode code is temporarily stored in the buffer 22 (step 302). Thereafter, when any one of keys included in the numeral keys 10 and the function keys 12 is actuated by the operator, the key input detection circuit 24 develops a control signal (step 303) to transfer the preset mode code from the buffer 22 to a memory area 140 included in the central processing unit (CPU) 14 (step 304). When the preset mode code is introduced into the memory section 140, the preset mode code is determined by the central processing unit (CPU) 14 (step 305). The central processing unit (CPU) 14 selects preset operation programs stored in the read only memory (ROM) 26 (step 306). The following operation is controlled by the preset operation programs read out from the read only memory (ROM) 26 (step 307).

[1a. PRESET OF DIRECT PLU INFORMATION]

Then, the operator introduces job code, for example, "80" through the use of the numeral keys 10 (step 308) and the program selection instruction key (#) 122 (step 309) in order to select the programs related to the preset operation of the direct PLU function (step 310). Under these conditions, a desired department key 120 (step 311) and the department memory selection key (*) 123 (step 312) are actuated to select a memory area 2800 corresponding to the actuated department key (step 313). Then, a desired PLU code is introduced by the operator through the use of the numeral keys 10 (step 314) and the PLU code input key (ST) 125 (step 315) so that the desired PLU code is stored in the selected memory area 2800 corresponding to the actuated department key 120 (step 316). The thus conducted preset data is printed out by the printer 32 onto the receipt slip and/or journal paper (step 317). In this way, the direct PLU information is preset in the memory area 2800. When the preset operation is completed (step 318), the operator actuates the registration operation completion instruction key (TL) 126 (step 319) to inform the central processing unit (CPU) 14 of the completion of the preset operation of the direct PLU information. The random access memory (RAM) 28 in FIG. 1 shows an example, wherein the PLU code "10" is assigned to the department key 37 1", and the PLU code "15" is assigned to the department key "2". It is clear that the direct PLU function can be preset to the thirty department keys 120 in the embodiment of the electronic cash register shown in FIGS. 1 and 2.

[1b. PRESET OF PLU INFORMATION]

In order to conduct the preset operation related to the PLU information, the operator introduces job code, for example, "90" through the use of the numeral keys 10 (step 308) and the program selection instruction key (#) 122 step (309). The central processing unit (CPU) 14 selects the programs related to the preset operation of the PLU function (step 310). Under these conditions, a desired PLU code number is introduced from the numeral keys 10 (step 320), and the PLU instruction key (PLU) 121 is actuated (step 321). The central processing unit (CPU) 14 functions to select the memory area 2811 which corresponds to the PLU code number introduced by the operator (step 322). Then, the unit cost data is introduced by the operator through the numeral keys 10 (step 323), and the unit cost key (@) 124 is actuated (step 324). The central processing unit (CPU) 14 functions to introduce the unit cost data into the selected memory area 2811 (step 325). The preset information is displayed on the display device 30 and is printed out by the printer 32 onto the receipt slip and/or journal paper (step 326). The PLU preset operation is repeated to complete the preset operation for the entire PLU codes (step 327). When the preset operation is completed, the operator actuates the registration operation completion instruction key (TL) 126 (step 328) to inform the central processing unit (CPU) 14 of the completion of the preset operation related to the PLU function. In the embodiment of FIGS. 1 and 2, fifty PLU codes can be preset.

[2. REGISTRATION OPERATION]

In order to conduct the registration operation, the operator operates the mode selection switch 20 to place the electronic cash register in the registration mode (step 401). The registration operation programs stored in the read only memory (ROM) 26 are selected, and the following operation is controlled by the thus selected registration operation programs.

First, the operator determines whether the transaction is included in the transaction previously preset for the direct PLU function (step 402). If the commodity is included in the group suited for the direct PLU registration, the operator actuates a predetermined department key 120 corresponding to the PLU code assigned to the commodity (step 403). In response thereto, the central processing unit (CPU) 14 functions to select the memory area 2800 corresponding to the actuated department key 120 (step 404). Then, the central processing unit (CPU) 14 checks whether the PLU code is stored in the selected memory area 2800 (step 405). If the PLU code is stored in the selected memory area 2800, the PLU code is read out (step 406), and the memory area 2810 corresponding to the read out PLU code is selected (step 407). Then, the unit cost data stored in the memory area 2811 corresponding to the selected memory area 2810 is read out (step 408). The read out PLU code and unit cost data are displayed by the display device 30 and printed out by the printer 32 (step 409). At the same time, the transaction data is memorized in the memory area 2812 at the position corresponding to the read out PLU code (step 410).

In case the PLU code is not preset in the selected memory area 2800 (step 405), the central processing unit (CPU) 14 functions to conduct an error display (step 412) and clear the direct PLU registration mode (step 413).

When the commodity is suited for the normal PLU registration but not suited for the direct PLU registration (step 402 and 414), the operator introduces the PLU code from the numeral keys 10 (step 415) and, then, actuates the PLU instruction key (PLU) 121 (step 416). In accordance with the thus introduced PLU code, the central processing unit (CPU) 14 conducts the operation of the steps 407 through 410.

When the commodity is not suited for the direct PLU registration nor the normal PLU registration (steps 402 and 414), the operator introduces the unit cost of the commodity from the numeral keys 10 (step 417), and actuates the department key 120 of the department to which the commodity belongs (step 418). The central processing unit (CPU) 14 functions to check the memory area 2800 corresponding to the actuated department key 120 (step 419) in order to determine whether the PLU code is not stored therein (step 420). If the PLU code is not stored in the selected memory area 2800, the introduced transaction data is displayed on the display device 30, printed by the printer 32 (step 409), and memorized in the memory area 2801 at the position corresponding to the selected department (step 410).

If the PLU code is stored in the selected memory area 2800, the central processing unit (CPU) 14 conducts an error display (step 421) to indicate that the department mode registration is not possible. At the following step 422, the department mode registration is cleared.

When the registration operation is completed (step 411), the operator actuates the registration operation completion instruction key (TL) 126 (step 423) to instruct the completion of the registration operation to the central processing unit (CPU) 14. The central processing unit (CPU) 14 functions to calculate the total amount of the transaction (step 424), and the total amount is added to the cumulative data stored in an accumulation area 2813 included in the random access memory (RAM) 28 to update the cumulative data (steps 425 and 426). The total amount of the transaction is printed by the printer 32 and visually displayed by the display device 30 (step 427). With reference to the total amount displayed by the display device 30, the operator receives money from the customer and inputs the received amount into the electronic cash register by the numeral keys 10 (step 428) and, then, actuates the money tendered key (step 429). The central processing unit (CPU) 14 calculates the change (step 430), and functions to deliver the receipt slip (step 431) to complete the registration operation.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an electronic cash register including a plurality of department keys for introducing department access code information, a plurality of numeral keys for introducing numeral data, and a PLU instruction key for instructing a PLU (price look-up) operation, the improvement comprising:

memory means for storing preset data and registered data, said memory means including, a first memory section storing a plurality of price look-up codes and unit cost information associated with each price look-up code, and a second memory section storing a pluraity of department access codes each department access code being associated with one of said plurality of department keys, and a selected number of said plurality of price look-up codes, each of said selected number of said plurality of price look-up codes corresponding to one of said plurality of department access codes;

mode select means for choosing an operation for the electronic cash register from at least two operation modes including a price look-up registration mode and a direct price look-up mode;

processing means, responsive to said mode select means, for carrying out the operation chosen by said mode select means, where in said direct price look-up mode said processing means is responsive to an entered department key, said processing means accessing said second memory section and identifying a department access code corresponding to said entered department key, said processing means identifying a price look-up code corresponding to the department access code, and said processing means accessing a unit cost information associated with the price look-up code in said first memory section, and in said price look-up registration mode, said processing means is responsive to said numeral keys and the PLU instruction key, said processing means receiving a price look-up code entered with said numeral keys, said processing means accessing the unit cost information associated with said entered price look-up code from said first memory section.

* * * * *